United States Patent

[11] 3,630,040

| [72] | Inventor | Fred A. Goldfarb<br>143 Jewett Avenue, Jersey City, N.J. 07304 |
|---|---|---|
| [21] | Appl. No. | 45,606 |
| [22] | Filed | June 12, 1970 |
| [45] | Patented | Dec. 28, 1971 |

[54] AIR CONDITIONER
8 Claims, 3 Drawing Figs.

[52] U.S. Cl. ..................................... 62/5,
62/91, 62/317, 418/88
[51] Int. Cl. ........................................... F25b 9/02
[50] Field of Search ........................... 62/5, 91,
274; 418/88

[56] References Cited
UNITED STATES PATENTS

| 2,323,511 | 7/1943 | Baker | 62/274 |
|---|---|---|---|
| 3,432,089 | 3/1969 | Schibbye | 418/88 |
| 3,553,971 | 1/1971 | Crang | 62/5 |
| 3,558,248 | 1/1971 | Parker | 418/88 |

FOREIGN PATENTS

| 945,252 | 12/1963 | Great Britain | 62/5 |
|---|---|---|---|

*Primary Examiner*—William J. Wye
*Attorney*—Marshall A. Lerner

ABSTRACT: An air conditioner for a vehicle having an air washer and filter for supplying moisturized clean air to a screw-type of compressor which compresses the air and feeds it to a vortex tube. The cold-air outlet from the vortex tube is connected to a heat exchanger to enable the cold air passed from the vortex tube to the heat exchanger to ultimately cool the vehicle cabin.

INVENTOR
FRED A. GOLDFARB
BY Marshall A. Lerner
ATTORNEY

INVENTOR
FRED A. GOLDFARB

AIR CONDITIONER

BACKGROUND OF THE INVENTION

1. Field of Invention

The present invention relates to a vehicle air conditioner. More particularly, the present invention relates to an air washer for providing moisturized washed air to a carburetor as well as to a screw type of compressor. The compressor feeds compressed air to a vortex tube whose cold outlet is connected to a heat exchanger which cools the vehicle cabin. Alternatively, the hot-air outlet of the vortex tube may be connected to the heat exchanger to heat the vehicle cabin.

2. Description of the Prior Art

In he field of vehicular air conditioners, it has been the general practice to employ mechanical vapor compression refrigeration systems. Such systems generally employ a liquid refrigerant such as freon and use a small pump or compressor to raise the pressure of the refrigerant vapor. The refrigerant vapor is cooled and liquefied in a condenser by passing outside air over its surface to absorb heat from the refrigerant. The cooled and liquefied refrigerant is stored under pressure in a receiver or container. The liquid refrigerant vaporizes in an evaporator because of the heat which it absorbs from the air passing over the evaporator surface. This absorption of heat from the air results in a considerable reduction in the air temperature. A blower circulates air over the evaporator to thereby cool it and then deliver it to the passenger compartment. Such prior art devices require an elaborate system of controls, wiring, and tubing.

Such elaborate prior art devices are relatively expensive. The inherent complexities, and in particular, the use of a liquid refrigerant such as freon, cause maintenance expenses to be high. Typical prior art devices are recommended only in passenger vehicles having motors which contain eight cylinders or are in the high horsepower range. In the operation of such prior art devices, when a vehicle is standing still and the motor is idling, the air conditioner condenser partially blocks off the flow of air to the radiator. This blocking off of the flow of air causes the radiator to overheat.

SUMMARY OF THE INVENTION

The present invention provides an air-conditioning device for a vehicle which possesses none of the aforementioned disadvantages. It further provides an air-cleaning device and vapor injector for providing clean moist air to an automobile carburetor.

To attain this, the present invention provides an air washer and filter having an impeller comprising a fan and spinner. The impeller may be rotated by the action of a moving current of air the motion of which is imparted by the vacuum from the carburetor. Alternatively, the air washer and filter may be operated by an electrical motor driving a venturi fan or by an exhaust driven turbine.

The air cleaner consists of a container having directional scoops arranged on the top. A fan and spinner are mounted on a vertical shaft which is immersed in water contained in the container. The fan is arranged on the shaft slightly above the spinner and the level of water is kept below the level of the spinner. The shaft is hollow and open at the bottom. It further has ports located between the spinner and the fan. A slotted impinger ring is arranged circumferentially around the container at about the level of the ports. A circular filter ring having a diameter slightly greater than that of the impinger ring is arranged concentric to the impinger ring and in a circular groove around the side of the container.

Two output tubes are arranged on opposite sides of the container filter ring. Both tubes draw air through the filter ring. The rotation of the fan causes a suction of water through the hollow shaft and through the ports in the shaft onto the spinner. The rotation of the spinner causes the water to impinge on the impinger ring in atomized form and then onto the filter. The passage of the air through the wet filter causes a washing and moisturizing of the air. One tube is connected to the carburetor to provide clean ad water vapor thereto. The other tube transmits clean air which is highly saturated with moisture to a screw type of compressor. The saturated air is used to lubricate, cool and seal compressor screws.

The compressor is preferably a single-stage, positive-displacement, moisture-lubricated, screw type using two screw which rotate together. The drive screw turns the follower screw to that no timing gears are required. The moisturized air lubricates and seals the screws to thereby reduce friction. The air is highly compressed with a minimum temperature rise and is discharged smoothly to a vortex tube.

The vortex tube used in the present invention is well known in the prior art and embraces the concepts set forth in U.S. Pat. No. 1,952,281, dated Mar. 27, 1934, to G. J. Ranque. The vortex tube contains two output tubes. The hot-air output tube vents hot air to the atmosphere. The cold-air output is connected to a heat exchanger to conduct the cold air thereto. The flow and temperature of the hot and cold air streams can be varied over a wide range.

The heat exchanger uses the cold air from the vortex tube to cool the tubing in a manner well known in the art. Air is cooled by being blown over the tubing and is passed to the vehicle cabin to cool the cabin. Standard fan motors may be used to circulate the air in the heat exchanger. Alternatively, the hot-air outlet of the vortex tube may be connected to the heat exchanger to heat the cabin.

Accordingly, an object of the present invention is to provide low-cost air-conditioning means.

Another object of the present invention is to provide air-cleaning means.

Still another object of the present invention is to provide relatively maintenance-free vehicular air-conditioning means which uses air as a refrigerant.

Yet another object of the present invention is to provide vehicular air-conditioning means which is operable in a vehicle having a small engine or an air-cooled engine having any number of cylinders and which does not cause overheating of the radiator or engine when the vehicle is idling in traffic.

Other objects, advantages and novel features of the present invention will become apparent from the following detailed description of the invention when considered in conjunction with the accompanying drawings.

DESCRIPTION OF THE PREFERRED EMBODIMENT

Figure 1:
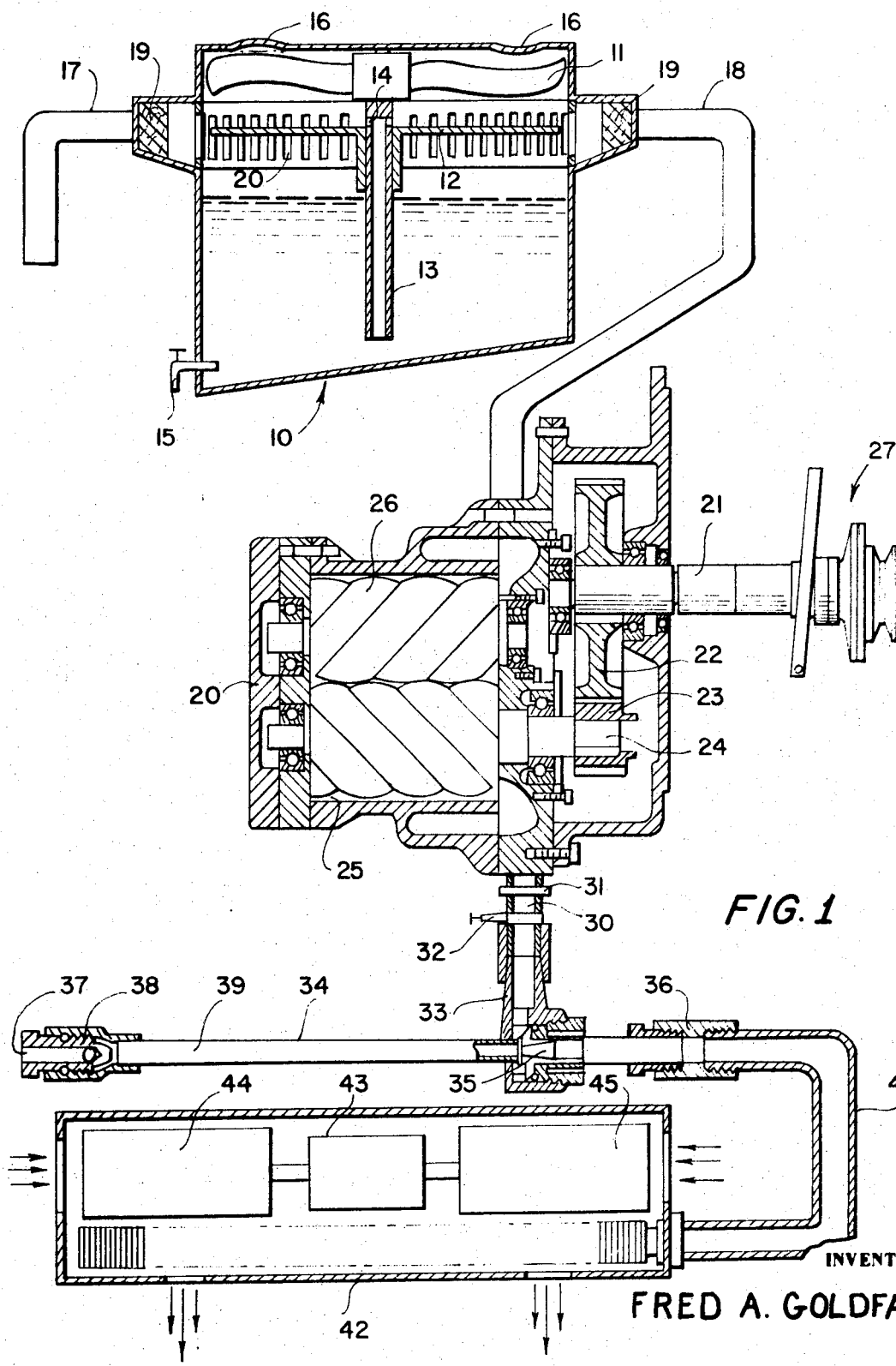
FIG. 1 is a preferred embodiment of the present invention.

Referring now to the diagram, there is shown an air cleaner having container 10 which contains water or any other suitable solution. The air cleaner has a fan 11 and spinner 12 mounted on shaft 13 which is immersed in the water solution. Shaft 13 is hollow and open at the bottom and contains ports 14 arranged slightly above spinner 12. Directional scoops 16 for directing the flow of incoming air are arranged on the top of the container. A slotted impinger ring 20 is arranged circumferentially around the container at about the level of spinner 12. Container 10 further contains a drain spout 15 for draining settled dirt and water.

Output tubes 17 and 18 are arranged on either side of the container ring holding filter 19, as shown. Output tube 17 is connected to the carburetor to supply clean air and water vapor thereto and output tube 18 is connected to the screw-type compressor 20. It is to be understood that although the fan and spinner are arranged to be rotated by a current of air obtained by the vacuum from the carburetor, they may be rotated by any standard motor arrangement.

The compressor is a single-stage, positive-displacement, moisture-lubricated, screw type, compressor. Driving energy is imparted to shaft 21 of the compressor by pulley and clutch assembly 27. The driving energy is transmitted by gears 22 and 23 to shaft 24. The gear ratio is arranged so that shaft 24 rotates more rapidly than shaft 21. Shaft 24 imparts rotational energy to drive screw 25. Drive screw 25, in turn, imparts rotational energy to roller screw 26.

The compressed air from compressor 20 is passed through tube 30, relief valve 31, pressure regulator 32, to the input tube 33 of vortex tube 34. The vortex tube is a standard prior art device and contains a nozzle 35, a cold outlet 36, a hot outlet 37, and a control valve 38.

The cold outlet is connected through insulated tube 40 to tubing 41 of heat exchanger 42. Motor 43 is connected to fans 44 and 45 to circulate air over tubing 42.

Figure 2:
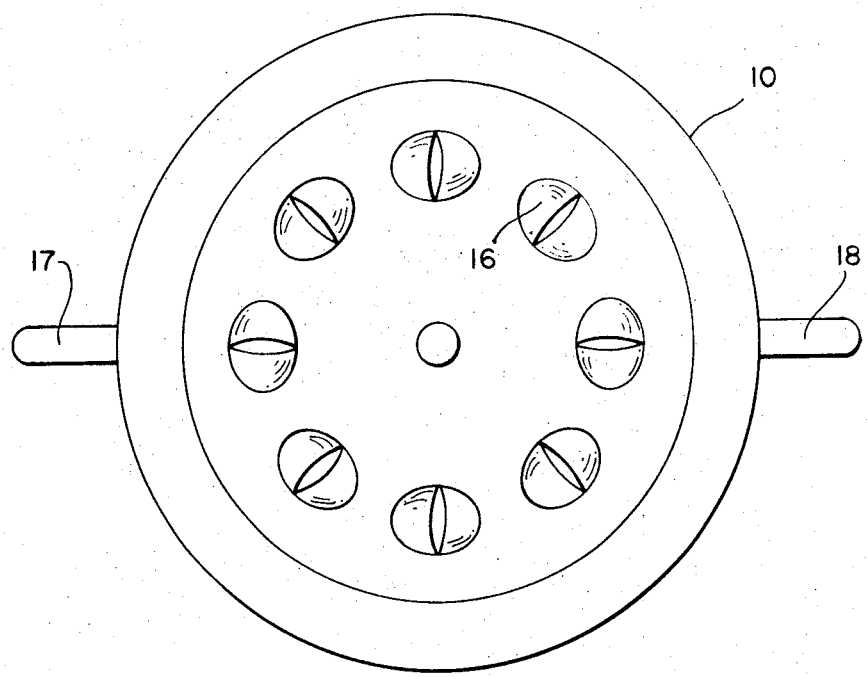
FIG. 2 is a top view of the air cleaner.

FIG. 2 is a plan view of the container 10 showing the directional scoops 16 arranged around the top.

Figure 3:
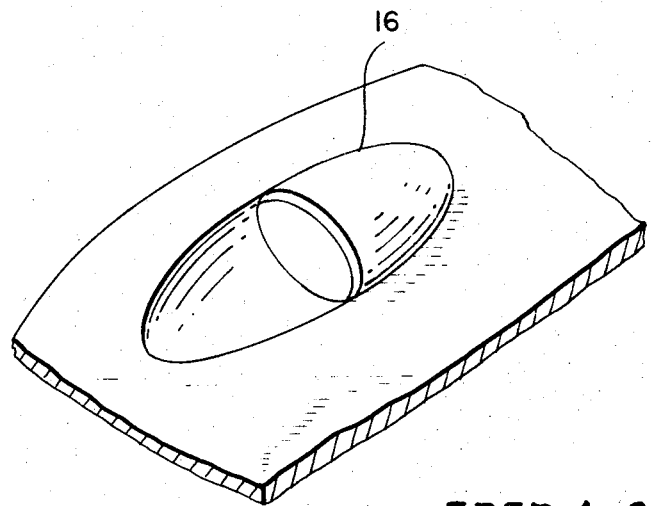
FIG. 3 is a detailed view of the directional scoops.

FIG. 3 shows directional scoop 16 in greater detail. Directional scoop 16 is contoured so as to direct incoming air onto fan 11 to thereby cause the fan to rotate.

In the operation of the present invention, a vacuum from the carburetor to which tube 17 is connected, causes air directed through directional scoops 16 to impinge on the blades of fan 11 to thereby cause it to rotate.

The rotation of fan 11 causes water to be pumped through the center of shaft 13 and out ports 14. The rotation of the spinner causes the water to be impinged on impinger ring 20 and thereby atomized. The atomized water is applied to filter 19. The intake air of the air cleaner is passed through wet filter 19 and is thereby washed and moisturized. Clean moisturized air is fed to a carburetor through tube 17 and to screw compressor 20 through tube 18.

Rotational energy is imparted from a vehicle motor (not shown) to shaft 21 of the compressor through pulley and clutch assembly 27. This rotational energy is transmitted through gears 22 and 23 to shaft 24 which turns drive screw 25 which, in turn, drives roller screw 26. The moisture in the air lubricates and seals the screws and thereby reduces friction between them. It is noteworthy that no timing gears are required in the usage of the screw type of compressor.

The compressed air is fed through tube 30, relief valve 31 and pressure regulator 32 to the input tube 33 of vortex tube 34. In such typical vortex tubes, the admitted pressurized fluid (in this case, air) is divided into two coaxial sheets of fluid moving in a gyratory motion and reacting upon each other so as to produce, under the action of centrifugal force, the compression of the outer sheet by the inner sheet. This compression absorbs a certain amount of work, which is evidenced by a rise in the temperature of the outer sheet and a corresponding decrease in temperature of the inner sheet.

In the use of the vortex tube in the context of the present invention, the compressed air first enters nozzle 35 which injects it circumferentially into the vortex generation chamber 39. The vortex moves through the chamber 39 toward hot outlet 37. Air near the surface of the chamber becomes hot and leaves through control valve 38 at hot outlet 37. Control valve 38 imposes enough pressure on the vortex to force some of the air to the center and back through the tube to cold outlet 36. This air becomes very cold in the process and leaves the tube through cold outlet 36. It is noteworthy that the vortex tube has no moving parts.

The cold air is passed through insulating tubing 40 to tubes 41 of the heat exchanger and then discharged to atmosphere. Motor 43 rotates fans 44 and 45 which circulate air over the vehicle cabin to cool it.

It is apparent that the above-described device requires fewer moving parts and is less complex and correspondingly less expensive than prior art devices. The ability to provide vehicular air conditioning without freon, the refrigerant commonly used in prior art devices, further reduces maintenance expenses. The moisturization of clean air passed to the carburetor further increases the efficiency of the engine. The screw compressor operates very efficiently and is particularly significant in increasing the efficiency of the overall system. The air-conditioning system called for by the present invention may be used in a vehicle having an engine with any number of cylinders commonly used in vehicle engines. Furthermore, the air conditioner does not cause overheating of the radiator when the vehicle engine is idling when the atmospheric temperature is relatively high, as is the case in typical prior art devices.

Obviously many modifications and variations of the present invention are possible in the light of the above teachings. For example, the water solution may be replaced by any suitable substance such as methanol or wood alcohol and ether. Furthermore, the hot-air output of the vortex tube may be connected to the heat exchanger for heating the vehicle cabin. It is therefore to be understood that within the scope of the appended claims, the invention may be practiced otherwise than as specifically described.

I claim:
1. An air conditioner comprising
   a combined air cleaner and moisturizer for cleaning and moisturizing air;
   a compressor for compressing the cleaned and moisturized air;
   first connecting means for connecting the cleaned and moisturized air from the air cleaner and moisturizer to the compressor;
   a vortex tube having an input tube, a first output tube for discharging cooled air, and a second output tube for discharging hot air;
   second connecting means for connecting said compressor to the input tube of said vortex tube for transmitting compressed air to said vortex tube;
   a heat exchanger;
   third connecting means for connecting either said first output tube or said second output tube of said vortex tube to said heat exchanger to thereby enable said heat exchanger to discharge cooled or heated air.

2. The device as described in claim 1 wherein said compressor is a screw type of compressor.

3. The device as described in claim 2 wherein said screw type of compressor is moisture lubricated.

4. The device as described in claim 3 wherein said screw type of compressor contains a single stage having a drive screw and a roller screw.

5. The device as described in claim 1 wherein said air cleaner contains a moisturized filter arranged in said first connecting means.

6. The device as described in claim 5 wherein said compressor is a screw type of compressor.

7. The device as described in claim 6 wherein said screw type of compressor is moisture lubricated.

8. The device as described in claim 7 wherein said screw type of compressor contains a single stage having a drive screw and a roller screw.

* * * * *